US012775323B2

(12) United States Patent
Mousazadeh et al.

(10) Patent No.: US 12,775,323 B2
(45) **Date of Patent: *Oct. 27, 2026**

(54) ADAPTIVE POWER MANAGEMENT

(71) Applicant: ATI Technologies ULC, Markham (CA)

(72) Inventors: Mohammad Hamed Mousazadeh, Markham (CA); Joohyun Lee, Markham (CA); Omer Irshad, Markham (CA); Xuetao Yan, Markham (CA); Alexander Sabino Duenas, Markham (CA); Muhammad Saad Musani, Markham (CA)

(73) Assignee: ATI Technologies ULC, Markham (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/628,684

(22) Filed: Apr. 6, 2024

(65) Prior Publication Data

US 2024/0248523 A1 Jul. 25, 2024

Related U.S. Application Data

(63) Continuation of application No. 17/557,093, filed on Dec. 21, 2021, now Pat. No. 11,953,965.

(51) Int. Cl.
*G06F 1/32* (2019.01)
*G06F 1/3234* (2019.01)

(52) U.S. Cl.
CPC .................................. *G06F 1/3234* (2013.01)

(58) Field of Classification Search
CPC ........................................................ G06F 1/32
See application file for complete search history.

(56) References Cited

U.S. PATENT DOCUMENTS 11,953,965 B2 * 4/2024 Mousazadeh ......... G06F 1/3234
2010/0102790 A1 * 4/2010 Buterbaugh ........ H02M 3/1584 323/283

(Continued)

OTHER PUBLICATIONS

International Searching Authority, "Search Report", in International Application No. PCT/IB2022/061500, dated Feb. 8, 2023, 11 pages.

(Continued)

*Primary Examiner* — Paul B Yanchus, III
(74) *Attorney, Agent, or Firm* — Hickman Becker Bingham Ledesma LLP

(57) ABSTRACT

Techniques are described for adaptive device power management. The device interface application of a hardware computing unit detects a launch of an application by the operating system (OS) to be executed on the hardware computing unit, in an implementation. The device interface application identifies the launched application and determines whether a hardware profile exists that is associated with the application. The hardware profile includes one or more hardware parameters that yield the optimal performance for power consumption by the hardware computing unit when executing the launched application. Based on determining that the hardware profile exists, the power policy of the OS is updated for the launched application, and thereby, the driver updates the power state(s) of the hardware computing unit based on the new power policy.

20 Claims, 4 Drawing Sheets

(56) References Cited

U.S. PATENT DOCUMENTS

| | | | |
|---|---|---|---|
| 2012/0110360 | A1 | 5/2012 | Lin et al. |
| 2012/0210150 | A1 | 8/2012 | de Lind van Wijngaarden et al. |
| 2018/0120923 | A1* | 5/2018 | Srinivasan ............ G06F 1/3209 |
| 2018/0143680 | A1 | 5/2018 | Pezeshgi et al. |
| 2019/0163250 | A1 | 5/2019 | Lee et al. |
| 2020/0209939 | A1 | 7/2020 | Chao et al. |

OTHER PUBLICATIONS

Mousazadeh, U.S. Appl. No. 17/557,093, filed Dec. 21, 2021, Notice of Allowance and Fees Due, Dec. 11, 2023.

Mousazadeh, U.S. Appl. No. 17/557,093, filed Dec. 21, 2021, Non-Final Rejection, Mar. 30, 2023.

* cited by examiner

ADAPTIVE POWER MANAGEMENT

This application claims the benefit as a continuation of application Ser. No. 17/557,093, filed Dec. 21, 2021 by Mohammad Hamed Mousazadeh et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE TECHNOLOGY

The present invention relates to the field of computing devices, in particular to adaptive power management thereof.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Power and performance are critical measurements for computing devices. Computing devices executing various loads are firstly optimized for performance; however, most computing environments (e.g., mobile computing) also have strict power constraints.

Besides mobile, power is the major resource that is consumed when heavy, compute-intensive workloads are executed. Such compute-intensive workloads, using general or different workload-specific engines (e.g., video, cryptography, direct memory access, decode, image signal/unit processing engines), significantly increase the power consumption of the computing systems. This consumption may be inhibiting for data center/cloud environments from a financial cost and capacity perspective. Additionally, with the proliferation of computing systems, the power consumption by computing devices becomes a major environmental challenge. For example, a compute-intensive workload may cause much more pollution (from the production of necessary electricity perspective) than an average car.

Accordingly, next-generation computing devices, while striving to maximize performance, ideally also intend to reduce power consumption. To measure the advance, performance-per-watt ("perf-per-watt") is a key metric for a processing unit's performance and power to indicate the overall efficiency of any processing unit. The perf-per-watt metric measures the rate of computation by a processing unit for every watt of power consumed to achieve the computation. With advances in compute-intensive applications and the global race in various computing fields such as deep neural network (DNN) developments, cryptocurrency mining, cloud computing, etc., such power and performance metric has become more critical for end-users as well as companies that provide cloud platforms.

One approach to improve the perf-per-watt metric is to switch power consumption based on the type of workload/application. With such an approach, the context for a workload is detected: e.g., compute-intensive, I/O intensive. Based on such a context, a request is submitted to the computing device to execute the workload with the optimal performance with the optimal power consumption. To accomplish this dynamic behavior, the computing device hardware may be designed with multiple performance/ power states. For example, when the operating system (OS) determines the context of the application is compute-intensive, the OS requests the computing device to execute the workload in the highest performance state of the device.

However, using this approach, for long-running compute-intensive applications, the computing device will always be in the highest performance state and the highest power consumption state.

Executing in the highest performance state eventually leads to overheating of the computing device and subsequent thermal-based slowdown. Furthermore, the computing device in the highest performance state consumes the most power, driving down the perf-per-watt metric.

BRIEF DESCRIPTION OF THE DRAWINGS

In the drawings of certain implementations in which like reference numerals refer to corresponding parts throughout the figures.

DETAILED DESCRIPTION

Figure 1:
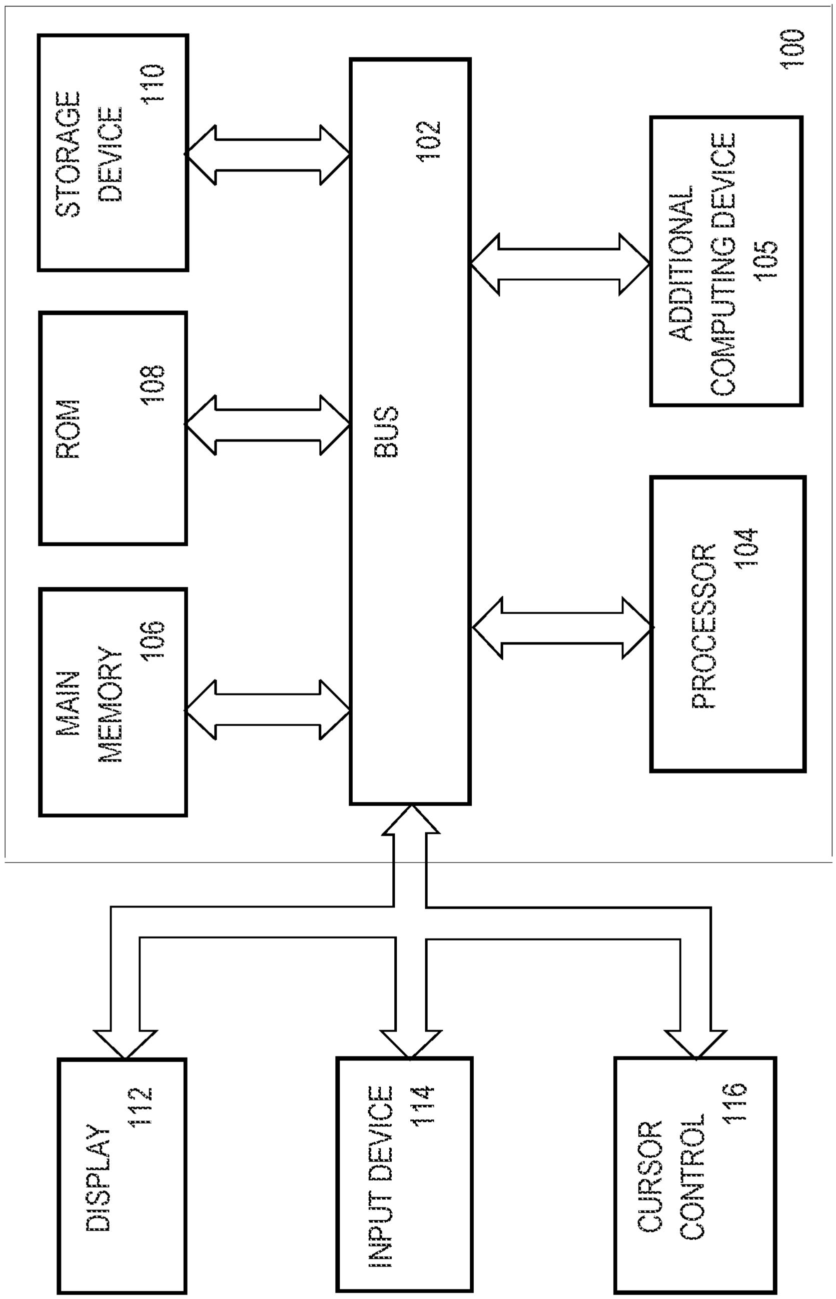
FIG. 1 is a block diagram that illustrates a computer system 100 upon which an implementation of the invention may be employed.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe adaptive power management for hardware computing units. In an implementation, the operating system (OS) executing a workload on a hardware computing unit applies hardware parameter(s) of the hardware computing unit to generate a power policy for the execution. The "hardware computing unit" term refers herein to a hardware processor, a hardware core, a hardware thread, hardware compute circuit block, hardware engine, or a computing device that includes any one or more of the mentioned. Non-limiting examples of a hardware computing unit are a GPU, a CPU, a direct memory access (DMA) engine, a graphics (GFX) engine, or a computing device that includes one or more GPUs and CPUs. The term "hardware parameter" refers herein to a parameter of a hardware computing unit that affects the determination for changing the power state of the hardware computing unit. The OS may apply value(s) of the corresponding hardware parameters received from the device interface application (driver) of a computing device to determine whether to change the power state of the computing device.

In one implementation, at the initiation of a computing device, the OS receives values of one or more hardware parameters for the hardware computing unit(s) that execute OS's workloads. The OS uses the hardware parameter values to generate a power policy for a workload. The term "power policy" refers herein to a policy that describes the power states that the OS sets for the hardware computing unit(s) executing a workload.

Unlike context-based power policy, the OS may fine-tune the power policy for workloads of the same context; two compute-intensive workloads may have different tuning parameters that yield different power policies. Based on the particular workload/application and the hardware parameter values, the OS may alter the power states of a hardware computing unit while executing compute-intensive workloads. For example, unlike context-based power policy, the OS may determine to lower the power state (to decrease clock frequency, voltage, and/or other settings that save power consumptions), even while performing a compute-intensive workload. Although it may seem that such a change in power state may adversely affect performance, the OS performs a switch to a lower power state when the OS determines that the portion(s) (operations/instructions) of the executing workload are not compute-intensive (e.g., no job submissions to hardware computing units such as when memory or I/O operations are executed).

In such an implementation, while the power policy is customized for each workload, the OS alone determines this power policy. Once determined, during the execution of the workload, the OS instructs the driver to change the hardware computing unit power state from one state to another, according to the power policy. The hardware computing unit(s) accordingly switch between performance and power consumption optimized states according to the policy. However, hardware computing unit(s) themselves have no way to further optimize the power policy for the particular workload, even if the power policy may be further improved based on the specifics of the hardware computing unit(s) as applied to that particular workload.

In another implementation, a profile of settings for hardware parameters of the computing device is generated for a workload or a user application thereof. The setting(s) for the hardware parameter(s) may be heuristically selected to yield the best perf-per-watt performance on a computing device with minimal (if any) compromise to the performance. The term "hardware parameter profile" or "hardware profile" refers to a set of values for corresponding hardware parameters that yield the optimal performance for power consumption by a computing device. When a user application is launched, the driver identifies the application, and the corresponding hardware parameter profile is retrieved. The selection of the hardware parameter profile may be further based on the computing device or the hardware processing unit(s) on which the workload is to be executed. Once the hardware profile is retrieved, the driver communicates one or more hardware parameter values to the OS. The OS uses the hardware parameter values to generate and enforce an updated power policy. The updated power policy is specific both to the workload and to the hardware computing unit on which it is at least partially being executed. The OS then adjusts the power state of the hardware computing unit based on the updated power policy.

System Overview—Computer System

According to one implementation, a user application having one or more workloads may be executed by one or more computer systems. The computer systems may include digital electronic devices such as one or more application/workload-specific integrated circuits (ASICs) or field-programmable gate arrays (FPGAs) that are persistently programmed to execute user application instructions. The computer systems may include one or more general-purpose hardware processors programmed to execute user application instructions in firmware, memory, other storage, or a combination. The computer systems may also combine general-purpose hardware processors with custom hardware logic (e.g., ASICs or FPGAs) to execute user application instructions. The computer systems may be desktop computer systems, portable computer systems, handheld devices, networking devices, or any other device that incorporates hard-wired and/or program logic to execute user application instructions.

For example, FIG. 1 is a block diagram that illustrates a computer system 100 upon which an implementation of the invention may be employed. Computer system 100 includes a bus 102 or other communication mechanism for communicating information and a hardware processor 104 coupled with bus 102 for processing information. Hardware processor 104 may be, for example, a computing device such as a general-purpose microprocessor and may contain one or more hardware processing units.

Computer system 100 also includes a main memory 106, such as a random access memory (RAM) or another dynamic storage device, coupled to bus 102 for storing information and instructions to be executed by processor 104. Main memory 106 also may be used for storing temporary variables or other intermediate information during the execution of instructions to be executed by processor 104. Such instructions, when stored in non-transitory storage media accessible to processor 104, may be executed by computer system 100 to perform the operations specified in a user application.

Computer system 100 further includes a read-only memory (ROM) 108 or other static storage device coupled to bus 102 for storing static information and instructions for processor 104. A storage device 110, such as a solid-state disk, magnetic disk, or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 may execute user application instructions using additional computing device 105, such as customized accelerated computing devices, one or more ASICs or FPGAs, firmware, and/or program logic which in combination with the computer system performs operations of the user application. According to one implementation, the operations of a user application are performed by computer system 100 in response to processor 104 and/or additional computing device 105 executing one or more sequences of one or more user application instructions contained in main memory 106. Such instructions may be read into main memory 106 from another storage medium, such as storage device 110. Execution of the sequences of instructions contained in main memory 106 causes processor 104 and/or additional computing device 105 to perform the process steps described herein.

The term "storage media" as used herein refers to any non-transitory media that store data and/or instructions that cause a machine to operation in a specific fashion. Such storage media may comprise non-volatile media and/or volatile media. Non-volatile media includes, for example, optical, solid-state, or magnetic disks, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 and/or additional computing device 105 for execution. For example, the instructions may initially be carried on a magnetic disk or solid-state drive of a remote computer. The remote computer can load the instructions into its dynamic memory and send the instructions over the internet. A networking device of computer system 100 can receive the data, and appropriate circuitry/firmware can place the data on bus 102. Bus 102 carries the data to main memory 106, from which processor 104 or additional computing device 105 retrieves and executes the instructions. The instructions received by main memory 106 may optionally be stored on storage device 110 either before or after execution by processor 104 and/or the additional device.

System Overview—Adaptive Real-Time Power Management System

Figure 2:
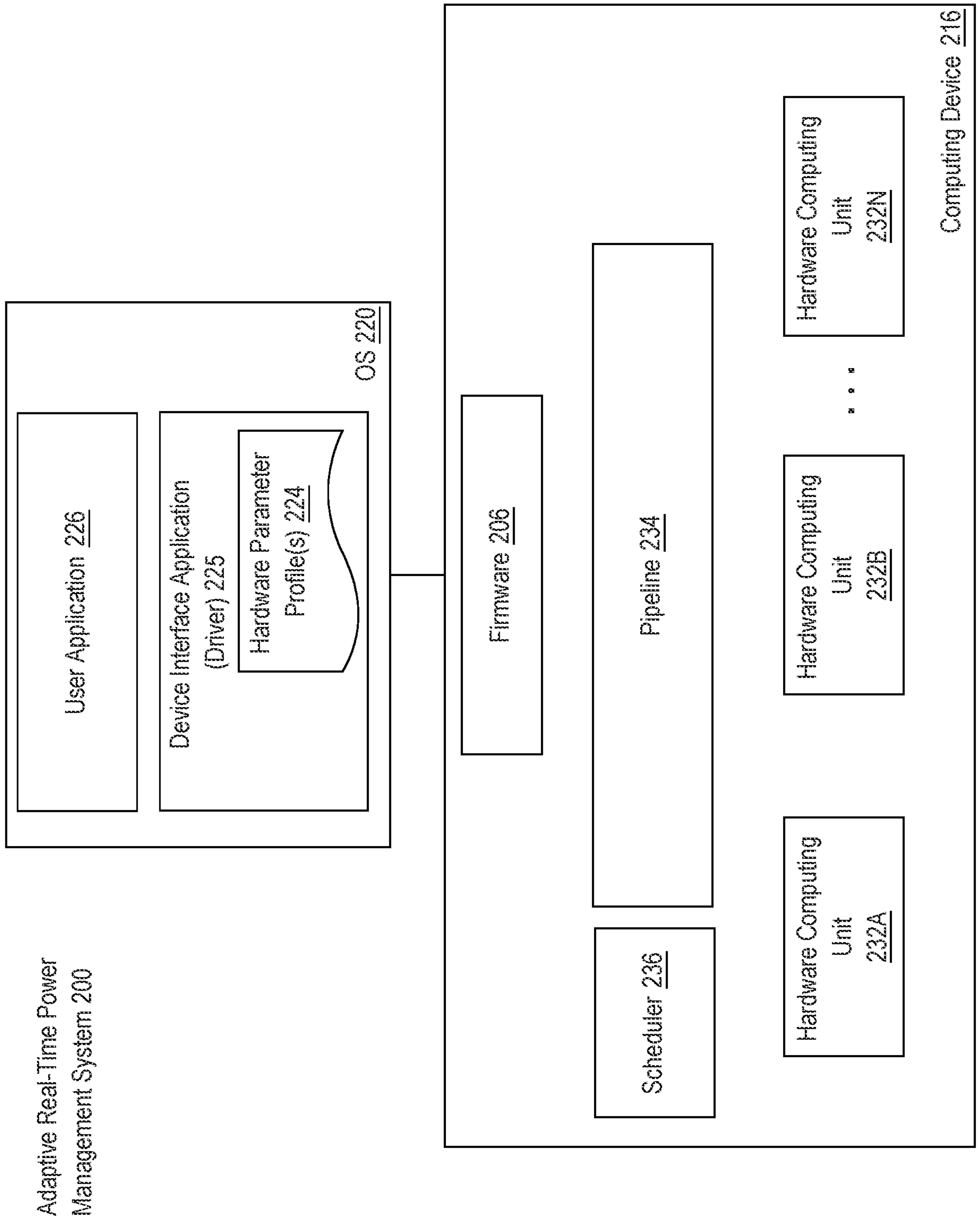
FIG. 2 is a block diagram that depicts an adaptive real-time power management system (ARTPMS) for the execution of workload(s) with power optimization, in an implementation.

FIG. 2 is a block diagram that depicts an adaptive real-time power management system (ARTPMS) for the execution of workload(s) with power optimization, in an implementation. ARTPMS 200 may be a portion of computer system 100 and include one or more components discussed above. In an implementation, ARTPMS 200 includes computing device 216 for the execution of one or more programmed instructions as directed by operating system (OS) 220.

Processor 104 or additional computing device 105 may be examples of computing device 216. Computing device 216 may execute commands and programs of OS 220 and its applications, such as user application 226. In an implementation, the commands and programs are for selected functions, such as graphics operations and non-graphics operations suited, for example, to perform parallel processing. Computing device 216 is used, for example, to execute graphics pipeline operations such as pixel operations, geometric computations, and rendering an image to display device 112 based on commands received from the processor 104 and/or additional computing device 105. Computing device 216 may also execute compute processing operations that are not related to graphics operations, such as operations related to video, physics simulations, computational fluid dynamics, or other tasks, based on commands received from other processors (e.g., such as processor 104 and/or additional computing device 105).

Example processor types for computing device 216 include a CPU, a GPU, a CPU, and GPU located on the same die, or one or more hardware computing units (e.g., cores) 232A-N.

Scheduler 236 is configured to perform operations related to scheduling various units of execution (e.g., workgroups and wavefronts) on different computing units 232A-N, in an implementation. Execution of processing tasks on computing device 216 is suitable for general computations or graphics-related operations such as pixel value calculations, vertex transformations, and other graphics operations. Pipeline 234 accepts processing commands from memory or additional computing device (e.g., 105) and accordingly provides computation tasks to hardware computing units 232A-N for execution in parallel, in an implementation.

Computing device 216 may be configured by OS 220 of ARTPMS 200 for power management using device interface application 225 (e.g., kernel-mode driver, user-mode driver, universal mode driver), also referred herein to as "driver." In an implementation, OS 220 may communicate with firmware 206 through driver 225 to configure computing device 216, such as to change the power state of computing device 216.

Driver 225 may maintain hardware parameter profile(s) 224 for various applications or groups thereof. Profile(s) 224 may include predetermined (e.g., determined prior to OS 220 initialization or the user application 226 runtime) hardware parameter value(s) for optimal execution of the application on computing device 215, hardware computing unit 232A-N, and/or any identifiable class of such devices.

When executing application 226, OS 220 communicates with computing device 216 (e.g., processor 104 or additional computing device 105) to control the operation of the hardware. In an implementation, OS 220 performs configuration by requesting driver 225 to request firmware 206 to change the power state(s) of hardware computing units 232A-N of computing device 216. OS 220 requests such change according to the generated power policy by OS 220 for computing device 216 and/or launched user application 226.

For example, when launched application 226 is identified, driver 225 parses hardware parameter profile 224 and reads the hardware parameter value(s) from hardware parameter profile 224 for the identified application 226 and/or computing device 216. The stored data is passed to OS 220, which in turn generates the power policy for computing device 216.

During the execution of application 226, firmware 206 of computing device 216 receives an update to the power state from OS 220, in an implementation. Firmware 206 may include corresponding configurations to control power management of hardware of computing device 216 (e.g., CPU, graphics card). By applying the appropriate configuration (e.g., clock speed parameters, clock voltage parameters, clock gating parameters, power gating), firmware 206 sets the updated power state for computing device 216. Firmware 206 may be stored in non-volatile memory (e.g., a hard disk, motherboard boot read-only memory (ROM), and BIOS memory).

Functional Overview

Figure 3:
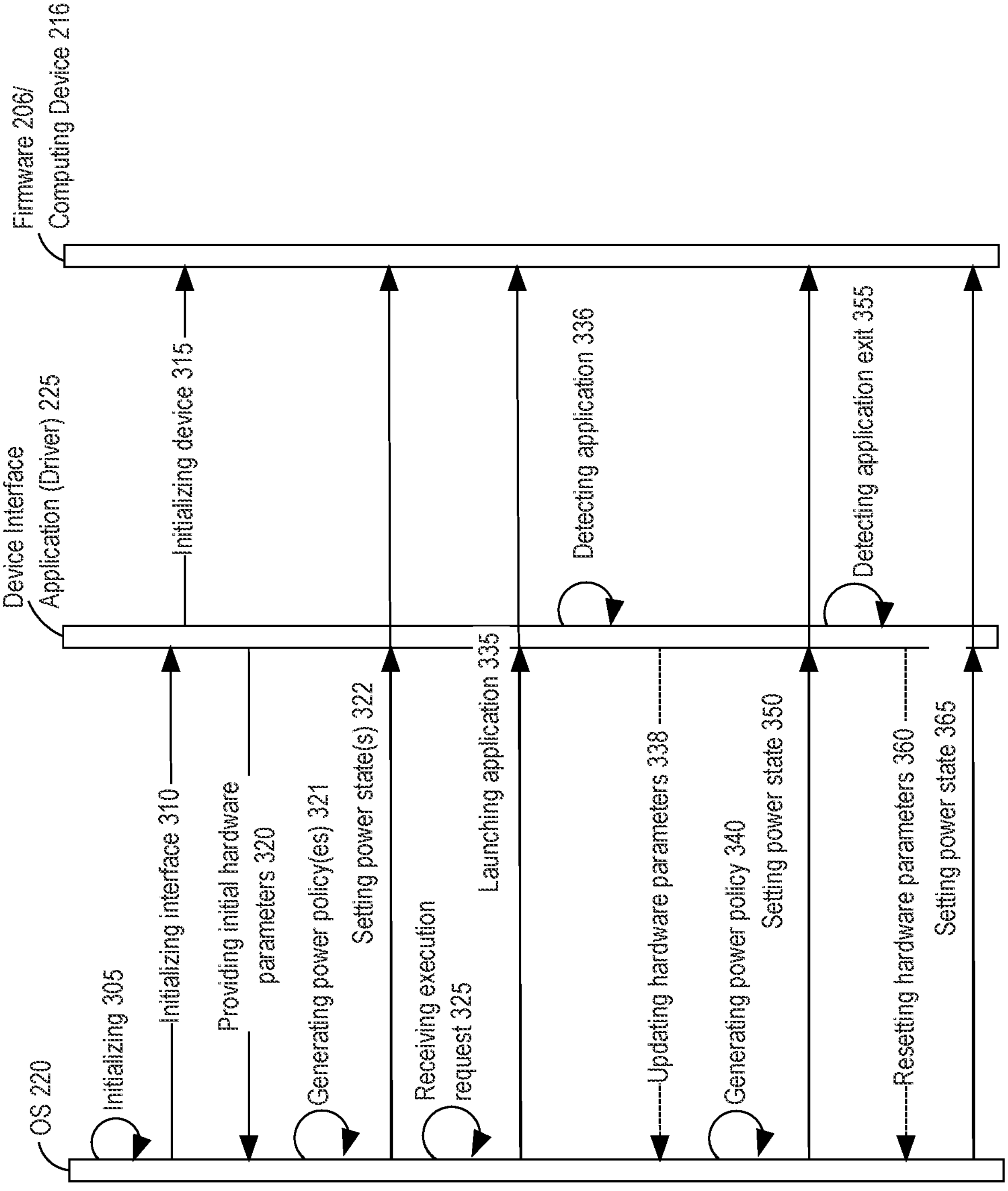
FIG. 3 is a sequence diagram depicting the process of adaptive real-time power management, in an implementation.

FIG. 3 is a sequence diagram depicting the process of adaptive real-time power management, in an implementation. One or more of the steps described below may be omitted, repeated, and/or performed in a different order. Accordingly, the specific arrangement of steps shown in FIG. 3 should not be construed as limiting the scope of the invention. Further, the steps shown below may be modified based on the data structure used to store hardware profile data, the number of applications launched and the concurrency of the execution, and/or the specific state of the operating system and computing device executing such one or more applications.

At step 305, OS 220 is initialized. This may occur as part of a boot-up of a computer system or spawning of OS 220 in a virtual machine. At the initialization, at step 310, OS 220 discovers and initializes installed devices, including computing device 216. Driver 225 is initialized and configures computing device 216 by communicating setting value(s) to firmware 206 at step 315 to initialize computing device 216.

Functional Overview—Hardware Parameters

At step 320, driver 225 provides OS 220 an original set of hardware parameter values of computing device 216. In an implementation, the original set of values is particular to computing device 216 and may depend on its internal architecture and may describe its hardware capabilities. The hardware parameter values are identifiable by the class, type, manufacturer, and/or model of computing device 216.

In an implementation, this initial hardware parameter value set is not specific to any application that may be executed on computing device 216. However, if any of the hardware parameter values change, the OS's power policy is affected for a particular application, and thus, the power state that OS 220 sets during the execution of an application. Accordingly, the power consumed and performance obtained for the execution of the application may change.

Hardware parameter(s) may control the power consumption and performance by indirectly affecting one or more power features. An example set of hardware parameters that control the entry/exit hysteresis of power features may include one or more of:

- Transition Latency: the time that it takes for the component to return to its lowest power consumption state;
- Residency: minimum time to spend in a power state to compensate for power and/or performance penalty associated with switching states. Stated differently, the minimum time to spend in a power state to make the transition worthwhile of the expected savings from the transition;
- Nominal Power: the power consumption of the device in a particular state, for example, in the minimum power consumption state and/or maximum performance state.

Such parameters may control power features such as dynamic power management (DPM) features (e.g., clock speed parameters, clock voltage parameters, power gating, and clock gating parameters), memory timing features, and heat generated features (e.g., fan control, thermal design power (TDP)). Alternatively or additionally, such power features may be directly represented by the corresponding hardware parameter(s).

Functional Overview—Generating Power Policy

In an implementation, hardware parameter value(s) are used by OS 220 to generate power policy for any one or more of its execution workloads/applications. Accordingly, after receiving initial hardware parameters at the initialization, at step 320, OS 220 may generate one or more power policies for various application(s) at step 321. Such a power policy is not specific to the application as executed on a hardware computing unit, as the initial hardware parameters used from step 320 are non-specific (static) to any of the applications and their workloads.

In an implementation, a power policy for a computing device maps various conditions associated with the runtime of an application to the corresponding power states. For example, if a particular runtime statistics matches a condition(s), OS 220 requests computing device 216 to be set to the corresponding power state of the mapping. Thus, for a given runtime statistics of an application, the power policy determines: a) whether to transition the computing device to a different power state, b) what power state to transition to, and/or c) how long is an optimal duration to be in a particular power state; for example, minimum time to spend in a power state to compensate for power and/or performance penalty associated with switching power states, in an implementation.

Accordingly, depending on what was (is or predicted to be) executed by the application, OS 220 determines the most optimal power state for such an execution. At step 322, OS 220 may set such power state(s) to computing device 216 through driver 225 communicating with firmware 206. The execution-specific power state yields better perf-per-watt performance than context-based power management. (In context-based power management, for a compute-intensive workload, the clocks are set to a high level at all times for the (thus, high power consumption) regardless of what operations are executed within the compute-intensive workload.)

Additionally, the power policy generated by OS 220 may further take into account the limitations and properties of computing device 216. The limitations and properties of computing device 216 are represented by the hardware parameters of computing device 216 received at step 320, as discussed above. In an implementation, the hardware parameters may affect the mappings of execution to power state and affect OS parameters (e.g., transition latency, residency, and/or nominal power). For a different computing device (thus a different set of hardware parameters), the same runtime statistics of the same application may result in a different power state.

Functional Overview—Optimizing Power Policy

The limitations and properties of computing device 216 may affect different applications differently. As discussed above, the power consumption may be further optimized by customizing the power policy for each application as it applies to a hardware computing unit on which the application is to be executed. By using the same hardware parameter values for any application, OS 220 assumes that the limitations and properties of computing device 216 affect all applications in the same way.

In an implementation, an application is executed with various hardware parameter values until heuristically, a particular set of hardware parameter values are selected for the application as having the best perf-per-watt metric without a significant compromise in performance. Prior to execution by OS 220, various benchmarking applications, photo editing applications, cryptocurrency mining applications, and others have been executed on various hardware computing units, including computing device 216. For each application (or a group thereof) and computing device pair (or a class thereof), a set of hardware parameter values is selected that yields the optimal perf-per-watt metric for desired performance. A driver for one or more hardware computing units may store the hardware parameter profiles with the optimal hardware parameter values, each associated with a particular application and a particular hardware computing unit of the one or more hardware computing units. Alternatively, a hardware parameter profile may exist for a group of applications or a class/type/device/system of hardware computing units or a combination thereof. For example, driver 225 may contain a hardware parameter profile with the optimal hardware parameter values for a group of the graphic editing application, of which application 226 is a member, and certain models of GPUs, to which computing device 216 belongs.

At the launch of an application, Driver 225 may determine the application and provide hardware parameter value(s) corresponding to the application and the hardware computing unit. At step 325, OS 220 receives a request for execution of an application, such as application 226. OS 220 launches application 226 for execution on at least computing device 216, at step 335. Based on the information associated with the application, OS 220 may generate a power policy to be applied on computing device 216 while executing the application.

At step 336, driver 225 may detect that the application submitted to computing device 216 for execution is application 226, as an example. If application 226 has a hardware parameter profile, driver 225 updates OS 220 hardware parameters with setting values from hardware profile(s) 224, at step 338. When OS 220 generates a power policy for application 226 at step 340, the power policy is based on application 226 specific hardware parameters. Thereby, driver 225 affects OS 220's power policy and makes the power policy in tune with the hardware computing unit's properties and limitations as applied to application 226.

Figure 4:
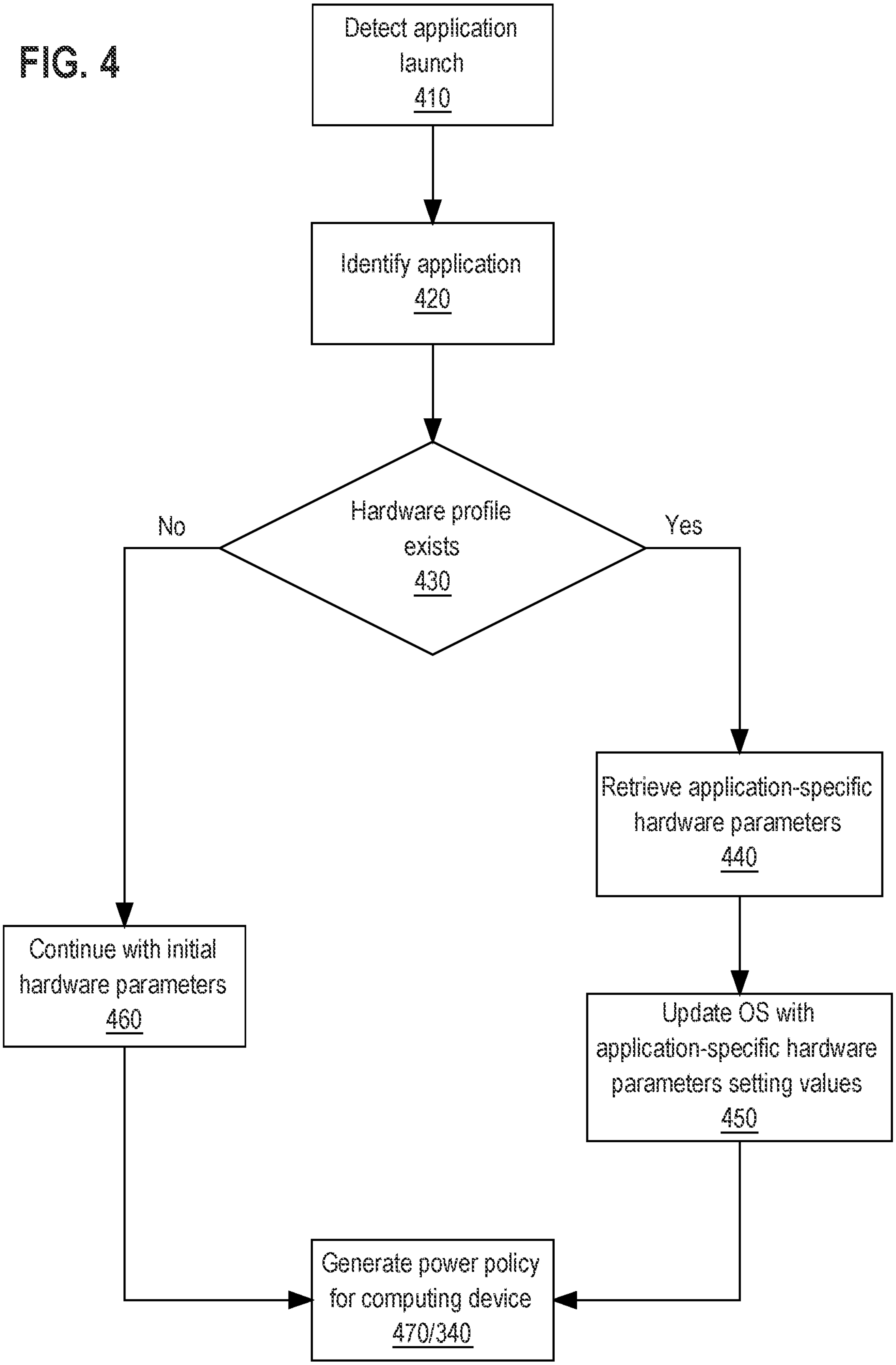
FIG. 4 is a flowchart that depicts a process for generating power policy for a hardware computing unit that is associated with an executing application and the hardware computing, in an implementation.

FIG. 4 is a flowchart that depicts a process for generating power policy for a hardware computing unit that is associated with an executing application and the hardware computing, in an implementation. One or more of the steps described below may be omitted, repeated, and/or performed in a different order. Accordingly, the specific arrangement of steps shown in FIG. 4 should not be construed as limiting the scope of the invention. Further, the steps shown below may be modified based on the data structure used to store hardware profile data.

At step 410, an application launch in OS 220 is detected by ARTPMS 200. For example, driver 225 for the hardware computing unit, computing device 216, on which the application, e.g., application 226, is to be executed, detects the launch of the application.

In one implementation in which another application is already executing, the process may decide whether to continue the steps with the newly launched application. The process may compare the priorities of the newly launched application and the currently executing application to determine whether to proceed and update the hardware parameter(s) for the newly launched application. For example, if the newly detected application has a higher priority, the process proceeds to the next step. Otherwise, if the newly launched application has a lower priority than the currently executing application, in this example, the process ends. The priority may be represented by an identifier (e.g., the higher is the identifier, the higher is the priority) and may be stored in the hardware profile for the application. A user may set priority for an application through a user interface (UI). The request that is received from the UI may contain a priority for application(s) or a group thereof for the computing device(s) or a class thereof. The process updates the appropriate entry for the application in the hardware profile with the new priority. Alternatively or additionally, the priority may be assigned by the OS.

In another implementation in which another application is already executing, the process may decide to continue the steps with the newly detected application regardless of the already executing application. Accordingly, the process may over-ride the hardware profile of the already executing application with the newly detected application's hardware profile if one exists (see step 430).

At step 420, the process identifies the application submitted for execution. The application may be identified by the identifying information that is received by driver 225 from OS 220. For example, driver 225 may receive the name of the executable file (e.g., the name of the application) or the process id assigned by OS 220 and use such identifying info for lookup into hardware profile(s) 224.

At step 430, the process determines whether a hardware profile exists for computing device 216 and the launched application. For example, the process looks up into hardware profile(s) 224 to determine whether a hardware profile is associated with launched application 226 and computing device 216. Computing device 216 may be identified by device description, which may include one or more of: device name, model name, serial number, part number, device identifier, version, stock-keeping unit (SKU). If no hardware profile is identified, the process determines which group(s) of applications launched application 226 is a member of. If a hardware profile is identified for such a group, then the hardware profile exists for launched application 226. Similarly, the process may test whether there is a hardware profile for the class of computing device 216 that is also associated with the group or the application 226 itself.

For example, a "FAHBench" application is launched on computing device 216 with the "Navi 21" device description. Once the application is identified, driver 225 looks up in its blob file to determine whether a hardware profile exists for the "FAHBench" application and "Navi 21" computing device pair. If none exists, driver 225 may check if a hardware profile exists for GPU benchmark applications, to which the FAHBench application belongs, for the "Navi 21" computing device, or for GPU's to which class the "Navi 21" computing device belongs.

If it has been determined at step 430 that a hardware profile exists for the launched application and computing device 216, the process continues to step 440 and retrieves the hardware parameter value(s) from the identified hardware profile at step 440. At step 450, the process requests OS 220 to update its hardware parameter values with the retrieved hardware parameter values for the execution of the application.

Conversely, if, at step 440, driver 225 determines that no hardware profile exists for the launched application, the process continues to step 460 and skips sending any updated hardware profiles. Therefore, OS 220 continues using the original/previous hardware parameters. For example, OS 220 may continue to use the hardware parameters received at the initialization of OS 220 for executing the launched application.

Regardless of which hardware profile parameters are used, the process causes generating a power policy for computing device 216 at step 470. Similarly, continuing with FIG. 3, regardless of whether the optional step 338 is performed, at step 340, OS 220 generates a power policy for application 226.

Based on applying the policy, OS 220 may determine to change the power state of computing device 216. When a change of power state is determined, at step 350, OS 220 instructs firmware 206 by requesting driver 225 to set the power state of computing device 216 to the new power state.

For example, if the runtime statistics indicate dominance of no-operation instructions or memory operations, OS 220, according to the generated policy, may instruct driver 225 to set the power state to the lowest power consumption power state. Conversely, if the runtime statistics indicate dominance of computing operations, OS 220, according to the generated policy, may instruct driver 225 to set the power state to the highest power consumption (most performance) power state.

In an implementation, driver 225 sets computing device 216 to a particular power state at step 350 by requesting firmware 206 to change the configuration of computing device 216. For example, the power state change may include changing the configuration for the frequency of the clock cycle and/or the voltage of computing device 216. A power state with a lower frequency clock or a lower voltage is a power consumption optimized power state, and a power state with a higher frequency clock or a greater voltage is a performance-optimized power state.

In an implementation, at step 355, driver 225 detects an exit/completion of the previously executing application, e.g., application 226. Upon such a detection, at step 360, driver 225 may provide OS 220 the initial hardware parameter(s) to update, in an implementation. In such an implementation, for future launched applications that do not have a hardware profile with driver 225 for computing device 216, OS 220 generates updated power policies with the original hardware parameters. At step 365, OS 220 may update the power state of computing device 216 through driver 225, requesting such an update from firmware 206. Accordingly, the previous power policy optimized for a previously executing application may not adversely affect the execution of the future application(s), in such an implementation.

Power Performance Metric Improvement

Table 1 depicts metric examples for the benchmarking “FAHBench” application executed using various techniques. As shown in the example of Table 1, even when the “FAHBench” application has no hardware profile (“static profile”), the application still executes with 24% perf-per-watt improvement over the context-based power management techniques. Such an improvement occurs with no performance drop in the execution (performance improved by 1.23%).

In the example in which “FAHBench” has a specific hardware parameter profile for the hardware computing unit to adapt to the application (“adaptive profile”), the application improves perf-per-watt metric even further 35.98% as compared to 24% with static profile, without an application-specific, adaptive, profile. Similarly, no performance degradation occurs compared to the context-based techniques, 0.35% improvement.

TABLE 1

Example FAHBench application metric executing with various techniques.

| FAHBench | Context-based | Static profile | Static vs. Context | Adaptive profile | Adaptive v. Context |
|---|---|---|---|---|---|
| Performance Score (higher is better) | 122.71 | 124.22 | 1.23% | 123.14 | 0.35% |
| Power (lower is better) | 46.86 | 38.13 | −19% | 34.58 | −26.20% |
| Perf/Watt (Higher is better) | 2.61 | 3.25 | 24% | 3.56 | 35.98% |

Table 2 depicts metric examples for the “cb_vl_video_proc” application, video processing application, executed using various techniques. Similar to the benchmarking application metric, the video processing application executes with significant perf-per-watt improvement over the context-based power management techniques for both the static and the adaptive profile power management techniques (see Table 2, “Perf/Watt” row at “Static/Context” and “Adaptive v. Context” columns). In particular, the adaptive profile techniques have close to 150% perf-per-watt metric improvement over the static techniques: 79% as compared with 113.15%. Remarkably, this improvement occurs with a negligible compromise to the performance, −0.4% (see Table 2, “Performance Score” row at Adaptive v. Context” column).

TABLE 2

Example cb_bitcoin application metric executing with various techniques.

| cb_vl_video_proc | Context-based | Static profile | Static vs. Context | Adaptive hardware profile | Adaptive v. Context |
|---|---|---|---|---|---|
| Performance Score (higher is better) | 175.11 | 175.47 | 0.21% | 174.42 | −0.4% |
| Power (lower is better) | 35.04 | 19.63 | −43.98% | 16.37 | −53.27% |
| Perf/Watt (Higher is better) | 4.99 | 8.93 | 79% | 10.65 | 113.15% |

Table 3 depicts metric examples for the "cb_bitcoin" application, cryptocurrency mining application, executed using various techniques. As shown in the example of Table 3, even when the "cb_bitcoin" application has no hardware profile ("static profile"), the application still executes with 8.4% perf-per-watt improvement over the context-based power management techniques. However, such an improvement occurs with a performance drop of 8.8% in the execution. This may not be acceptable for such workloads.

Unlike the static profile techniques' performance drop, with the adaptive techniques (having a specific hardware profile), the application has a low performance drop (performance dropped by 3.39%) as compared with the context-based techniques' performance. However, the perf-per-watt metric improves in this example compared to the context-based techniques by a similar 8.5%. From the end-user perspective, the adaptive profile power management techniques can provide reasonable performance while saving much power (i.e., monetary expenses).

TABLE 3

Example cb_bitcoin application metric executing with various techniques.

| cb_bitcoin | Context-based | Static profile | Static vs. Context | Adaptive hardware profile | Adaptive v. Context |
|---|---|---|---|---|---|
| Performance Score (higher is better) | 1298 | 1183.4 | −8.8% | 1254 | −3.39% |
| Power (lower is better) | 104.82 | 88.08 | −16% | 93.27 | −11% |
| Perf/Watt (Higher is better) | 12.38 | 13.43 | 8.4% | 13.44 | 8.5% |

Accordingly, in these examples, adaptive real-time power management techniques improve the perf-per-watt metric of applications without compromising the applications' performance.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

launching an application to be executed at least in part on a hardware computing unit, wherein the application is associated with a hardware profile;

generating, by an operating system, a new power policy for the hardware computing unit at least by comparing one or more properties of the hardware computing unit with one or more hardware parameter values of the hardware profile associated with the application;

updating a power state of the hardware computing unit based on the new power policy based, at least in part, on the hardware profile that is associated with the application.

2. The method of claim 1, wherein the new power policy indicates power states that the operating system, through which the application is launched, sets for the hardware computing unit executing the application.

3. The method of claim 1, further comprising updating, by the operating system, the power state of the hardware computing unit based on one or more policies that include the new power policy that is based on the hardware profile associated with the application.

4. The method of claim 1, further comprising:

maintaining the same new power policy for the hardware computing unit that is based on the hardware profile associated with the application;

while maintaining the same new power policy for the hardware computing unit, updating the power state of the hardware computing unit to a different power state.

5. The method of claim 4, wherein the new power policy indicates compute-intensive execution, and the different power state indicates a lower power state.

6. The method of claim 1, wherein the hardware profile includes one or more values of any one or more following hardware parameters: transition latency that describes a time to transition to a different power state; residency that describes time to stay in a transitioned power state that makes transition worthy; nominal power that describes lowest available power consumption.

7. The method of claim 1, further comprising:

identifying the application by retrieving one or more identifying information about the application, including any one or more of: execution file name of the application, process name of the application, or process identifier of the application.

8. The method of claim 1, wherein the application is a first application, the hardware profile is a first hardware profile, and the method further comprising:

launching a second application to be executed at least in part on the hardware computing unit;

determining whether a second hardware profile exists that is associated with the second application;

based on determining that the second hardware profile does not exist, continuing execution of the second application with current hardware parameter values.

9. The method of claim 1, wherein the application is a first application, the hardware profile is a first hardware profile, and the method further comprising:

launching a second application to be executed at least in part on the hardware computing unit;

determining whether a second hardware profile exists that is associated with the application, wherein the second hardware profile includes one or more second hardware parameter values that are different than one or more first hardware parameter values of the first hardware profile;

based on determining that the hardware profile exists, updating the power state of the hardware computing unit based on a second power policy that is different from the new power policy and is generated based at least in part on the second hardware profile that is associated with the second application.

10. The method of claim 1, wherein the application is a first application, the hardware profile is a first hardware profile, and the method further comprising:

launching a second application to be executed at least in part on the hardware computing unit, wherein the second application is associated with a second hardware profile;

determining that the second application has a higher priority of execution than the first application;

based on determining that the second application has a higher priority of execution than the first application and based on identifying the second application updating the power state of the hardware computing unit based on a second power policy that is different from the new power policy and is generated based at least in part on the second hardware profile that is associated with the second application.

11. A system comprising one or more processors and one or more storage media storing a set of instructions that includes instructions, which, when executed by the one or more processors, cause:

launching an application to be executed at least in part on a hardware computing unit, wherein the application is associated with a hardware profile;

generating, by an operating system, a new power policy for the hardware computing unit at least by comparing one or more properties of the hardware computing unit with one or more hardware parameter values of the hardware profile associated with the application;

updating a power state of the hardware computing unit based on the new power policy based, at least in part, on the hardware profile that is associated with the application.

12. The system of claim 11, wherein the new power policy indicates power states that the operating system, through which the application is launched, sets for the hardware computing unit executing the application.

13. The system of claim 11, wherein the set of instructions includes instructions, which, when executed by the one or more processors, further cause updating, by the operating system, the power state of the hardware computing unit based one or more policies that include the new power policy that is based on the hardware profile associated with the application.

14. The system of claim 11, wherein the set of instructions includes instructions, which, when executed by the one or more processors, further cause:

maintaining the same new power policy for the hardware computing unit that is based on the hardware profile associated with the application;

while maintaining the same new power policy for the hardware computing unit, updating the power state of the hardware computing unit to a different power state.

15. The system of claim 14, wherein the new power policy indicates compute-intensive execution, and the different power state indicates a lower power state.

16. The system of claim 11, wherein the hardware profile includes one or more values of any one or more following hardware parameters: transition latency that describes a time to transition to a different power state; residency that describes time to stay in a transitioned power state that makes transition worthy; nominal power that describes lowest available power consumption.

17. The system of claim 11, wherein the set of instructions includes instructions, which, when executed by the one or more processors, further cause:

identifying the application by retrieving one or more identifying information about the application, including any one or more of: execution file name of the application, process name of the application, or process identifier of the application.

18. The system of claim 11, wherein the application is a first application, the hardware profile is a first hardware profile, and wherein the set of instructions includes instructions, which, when executed by the one or more processors, further cause:

launching a second application to be executed at least in part on the hardware computing unit;

determining whether a second hardware profile exists that is associated with the second application;

based on determining that the second hardware profile does not exist, continuing execution of the second application with current hardware parameter values.

19. The system of claim 11, wherein the application is a first application, the hardware profile is a first hardware profile, and wherein the set of instructions includes instructions, which, when executed by the one or more processors, further cause:

launching a second application to be executed at least in part on the hardware computing unit;

determining whether a second hardware profile exists that is associated with the application, wherein the second hardware profile includes one or more second hardware parameter values that are different than one or more first hardware parameter values of the first hardware profile;

based on determining that the hardware profile exists, updating the power state of the hardware computing unit based on a second power policy that is different from the new power policy and is generated based at least in part on the second hardware profile that is associated with the second application.

20. The system of claim 11, wherein the application is a first application, the hardware profile is a first hardware profile, and wherein the set of instructions includes instructions, which, when executed by the one or more processors, further cause:

launching a second application to be executed at least in part on the hardware computing unit, wherein the second application is associated with a second hardware profile;

determining that the second application has a higher priority of execution than the first application;

based on determining that the second application has a higher priority of execution than the first application and based on identifying the second application updating the power state of the hardware computing unit based on a second power policy that is different from the new power policy and is generated based at least in part on the second hardware profile that is associated with the second application.

* * * * *